(12) United States Patent
Taylor

(10) Patent No.: US 6,539,006 B1
(45) Date of Patent: Mar. 25, 2003

(54) MOBILE STATION CAPABLE OF DETERMINING BASE STATION SUITABILITY

(75) Inventor: E. Reynold Taylor, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/368,870

(22) Filed: Aug. 5, 1999

(51) Int. Cl.$^7$ .............................................. H04B 7/216
(52) U.S. Cl. ...................... 370/335; 370/331; 370/342; 370/479; 375/144; 375/148
(58) Field of Search ................................. 370/335, 342, 370/347, 348, 479, 331–334; 375/144, 148

(56) References Cited

U.S. PATENT DOCUMENTS

| 5,652,748 A | 7/1997 | Jolma et al. ................. 370/320 |
| 5,920,549 A | 7/1999 | Bruckert et al. | |

FOREIGN PATENT DOCUMENTS

| GB | 2318952 | 5/1998 |

Primary Examiner—James Moore
(74) Attorney, Agent, or Firm—Myers Bigel Sibley & Sajovec

(57) ABSTRACT

A mobile station for use in a wireless communications system including a plurality of base stations is provided. The mobile station generally includes a searcher for measuring the strength of pilot signals transmitted by a plurality of base stations, a RAKE receiver having a plurality of receiver fingers, and a controller coupled to the searcher and RAKE receiver, the controller assigning a plurality of RAKE receiver fingers to a base station currently monitored by the mobile station for communication purposes, and selectively assigning at least one RAKE receiver finger to a first potential base station in the plurality of base stations, the first potential base station different from the currently monitored base station, the controller demodulating data received at the at least one RAKE receiver finger from the first potential base independent of data received at the other RAKE receiver fingers from the currently monitored base station, and determining, from the independently demodulated data, whether the first potential base station is suitable for use with a mobile station.

26 Claims, 2 Drawing Sheets

MOBILE STATION CAPABLE OF DETERMINING BASE STATION SUITABILITY

FIELD OF THE INVENTION

The present invention is directed toward a mobile station for use in a wireless communications system and, more particularly, toward a mobile station capable of determining base station suitability.

BACKGROUND OF THE INVENTION

Cellular systems designed according to the TIA (Telecommunications Industry of America) IS-95 standards typically utilize CDMA (Code Division Multiple Access) as the system platform. A CDMA system is a spread-spectrum system permitting multiple transceiver pairs (mobile phones and base stations) to use a wideband frequency channel, e.g., a 1.23 MHz wide channel, for receiving and transmitting messages. Within each wideband frequency channel, Walsh-Hadamard codes, commonly called Walsh codes, are typically utilized to uniquely identify each mobile station. A Walsh code generator in each mobile station transceiver encodes the message data with one of 64 unique orthogonal codes, thus permitting simultaneous communication by 64 mobile stations in each wideband frequency channel.

Base stations within a CDMA system generally use the same Pseudorandom Noise (PN) sequence to spread the signal across the wideband frequency channel. Each base station is uniquely identified in the system by using a unique starting phase, also known as a PN offset, with each base station having the capability to use all 64 Walsh codes. PN offsets thus provide an additional layer of coding in the time domain, permitting reuse of each of the 64 Walsh codes 512 times (currently there are 512 possible PN offsets available for use).

A mobile phone, or mobile station, configured for use in a CDMA system, typically utilizes a RAKE receiver generally having three or four input ports called fingers. The RAKE fingers are tuned to receive specific rays of energy that are transmitted from a base station. These rays can include the primary ray of energy transmitted from a base station, as well as reflections of that ray as the ray travels from the base station to the mobile station. The RAKE receiver receives the three or four rays of energy from the base station, which rays are then demodulated and combined to create a more error free signal.

In addition to traffic signals, each base station also broadcasts a pilot signal and a synchronization ("sync") signal. The pilot signal broadcast by each base station is formed by a constant level signal that is covered by Walsh code 0, which consists of all zeros. The pilot signal is commonly received by all mobile stations within range of the base station, and is used by the mobile station for identifying the presence of a CDMA system. The sync signal, which is covered by Walsh code 32, includes information concerning the respective base station. By tuning to a particular base station's sync channel, the mobile station can evaluate the suitability of a base station for use.

To detect pilot signals, CDMA mobile stations utilize a receiver-like device called a searcher. The searcher is configured to detect pilot signals broadcast by various base stations and measure their signal strength. The searcher can measure the received signal strength of the base station by tuning to its PN offset and measuring the strength of its pilot signal. The searcher operates independent of the RAKE receiver.

When a mobile station is in an idle mode, that is, when it is not on a call or is not trying to receive or originate a call, the mobile station simply monitors the base station with which it has last communicated. The base station that the mobile station is monitoring is said to be in the "Active Set" of the mobile station. In the idle mode, there is only one base station in the mobile station's Active Set.

Base stations also transmit what is called a Neighbor Set, which is a list of base stations in the general area that may be considered for use if the particular base station's signal becomes too weak. While in the idle mode, the mobile station receives this Neighbor Set of base stations from the currently monitored base station in its Active Set. While the mobile station is monitoring its current base station in its Active Set via its RAKE receiver, the searcher may be configured to measure the signal strengths of the pilot signals from the base stations in the Neighbor Set. Since only one base station is permitted in the mobile station's Active Set, i.e., the base station currently being monitored, all RAKE receiver fingers are required to be tuned to the same PN offset in the idle mode so that their demodulated signals can be additive, implying that they are energy rays or reflected rays of the same base station signal.

Generally, when a mobile station is in the idle mode, it will move to the base station in the Neighbor Set with the strongest pilot signal when the pilot signal of its Active Set base station becomes too weak. This is accomplished by directing the mobile station searcher to measure the pilot signal of the Active Set base station and the pilot signal of each prospective base station in the Neighbor Set. After evaluation of this search, the mobile station may choose to begin monitoring a different base station by tuning the RAKE receiver fingers to the PN offset associated with the different base station. However, only after switching over to monitor the new base station can the mobile station make a complete determination of that particular base station's suitability with the mobile station. If the mobile station determines that the new base station is not suitable for whatever reason, it must re-establish communication with the old base station, or the mobile station may enter a system determination sub-state which may require a substantial amount of time before contact with another base station is established. This is due to the restrictive nature of the RAKE finger assignments, demodulation and signal combination in the idle mode.

The present invention is directed toward overcoming one or more of the above-mentioned problems.

SUMMARY OF THE INVENTION

In a wireless communications system, a method of determining the suitability of a base station for use with a mobile station with the mobile station in an idle mode is provided. The method generally includes the steps of measuring the strength of pilot signals transmitted by a plurality of base stations, assigning a plurality of RAKE receiver fingers to a base station currently monitored by the mobile station for communication purposes, and selectively assigning at least one of the RAKE receiver fingers to a first potential base station in the plurality of base stations, with the first potential base station being different from the currently monitored base station. The data received at the at least one RAKE receiver finger from the first potential base station is demodulated independent of data received at the other RAKE receiver fingers from the currently monitored base station. From the independently demodulated data, it is determined whether the first potential base station is suitable for use with the mobile station. The determined result is stored in a memory, and the above-identified steps are repeated for all potential base stations in the plurality of base stations, the potential base stations being those whose measured pilot signal strength exceeds a threshold value.

In one form, the pilot signal strengths of the potential base stations determined to be suitable for use with the mobile station are monitored and, if the pilot signal strength of the currently monitored base station falls below a threshold value, the currently monitored base station is replaced with one of the potential base stations determined to be suitable for use with the mobile station. In a preferred form, the replaced potential base station includes the potential base station with the strongest monitored pilot signal strength.

The plurality of base stations generally includes a Neighbor Set of base stations transmitted by the currently monitored base station to the mobile station, with the Neighbor Set of base stations including those base stations potentially usable by the mobile station should the currently monitored base station become unavailable for use.

In a preferred form, the wireless communication system includes a Code Division Multiple Access wireless communications system.

A mobile station for use in a wireless communications system including a plurality of base stations is also provided. The mobile station generally includes a searcher for measuring the strengths of pilot signals transmitted by a plurality of base stations with the mobile station in an idle mode, a RAKE receiver having a plurality of receiver fingers, and a controller coupled to the searcher and RAKE receiver, the controller assigning a plurality of RAKE receiver fingers to a base station currently monitored by the mobile station for communication purposes, and selectively assigning at least one RAKE receiver finger to a first potential base station in the plurality of base stations, the first potential base station different from the currently monitored base station. The controller demodulates data received at the at least one RAKE receiver finger from the first potential base independent of data received at the other RAKE receiver fingers from the currently monitored base station and, determines, from the independently demodulated data, whether the first potential base station is suitable for use with the mobile station.

An object of the present invention is to determine the suitability of a base station to communicate with a mobile station prior to actually committing the entire RAKE receiver and processing capabilities of the mobile station's transceiver.

It is a further object of the present invention to determine the suitability of a base station to communicate with a mobile station with the mobile station in an idle mode.

Other aspects, objects and advantages of the present invention can be obtained from a study of the application, the drawings, and the appended claims.

BRIEF DESCRIPTION OF THE DRAWINGS

The features of the present invention which are believed to be novel are set forth with particularity in the appended claims. The present invention, together with its objectives and advantages thereof, may best be understood by reference to the following description taken in conjunction with the accompanying drawings, in which like reference numerals identify like elements and in which:

DETAILED DESCRIPTION OF THE INVENTION

Figure 1:
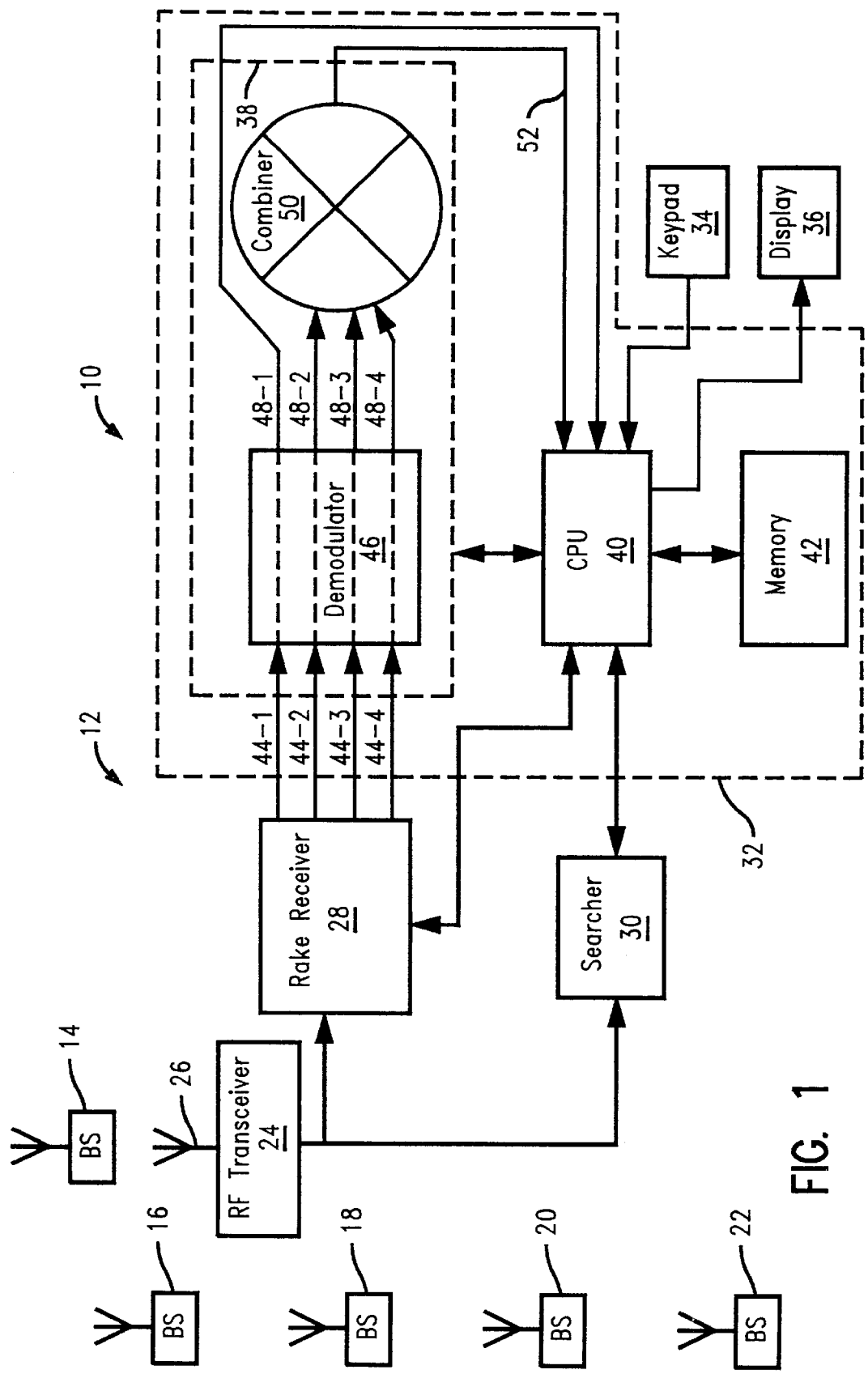
FIG. 1 is a block diagram of the inventive mobile station utilized within a CDMA communications system.

Referring to FIG. 1, a mobile phone or station, shown generally at 10, is provided for use in a wireless communications system 12, for example, a CDMA system, including a plurality of base stations 14, 16, 18, 20, 22. The mobile station 10 includes an RF (Radio Frequency) transceiver 24 for transmitting and receiving communication signals to and from the base stations via an antenna 26.

The mobile station 10 further includes a RAKE receiver 28, a searcher 30, a controller 32 and conventional keypad 34 and display 36 features permitting user interface. The controller 32 generally includes a DSP (Digital Signal Processor) 38, a CPU (Central Processing Unit) 40 and a memory 42. The antenna 26 receives RF signals from the base station 14 and the other base stations 16, 18, 20 and 22 in the vicinity, with some of the received RF signals being directly transmitted from the base stations to the antenna 26 and other received RF signals being reflected rays which are delayed in time. For purposes herein, it is assumed that the mobile station 10 has established a communications channel with the base station 14.

The RAKE receiver 28 is connected to the RF transceiver 24 and includes a plurality of receiver fingers 44-1,-2,-3,-4. As shown in FIG. 1, the RAKE receiver 28 includes four fingers, however, any number of receiver fingers could be implemented without departing from the spirit and scope of the present invention. The searcher 30 is also connected to the RF transceiver 24 and operates independent of the RAKE receiver 28. The searcher 30 detects pilot signals broadcast by the various base stations 14, 16, 18, 20, 22 and measures their strength. The searcher 30 results are supplied to the CPU 40 which controls the assignment of the RAKE receiver fingers 44-1,-2,-3,-4.

Upon the mobile station 10 being placed in an idle mode, the CPU 40 assigns RAKE receiver fingers 44-1,-2,-3,-4 to a current base station, for example, the first base station 14. The searcher 30 measures the pilot signals transmitted by the first base station 14, as well as the base stations 16, 18, 20 and 22. If the measured pilot signal from the second base station 16 is above a threshold value, then the CPU 40 reassigns RAKE receiver finger 44-1 to the second base station 16.

The data received at the RAKE receiver fingers 44-1,-2,-3,-4 are demodulated by a demodulator 46, with the data at the RAKE receiver finger 44-1 being demodulated independent of the data received at RAKE receiver fingers 44-2,-3,-4. Demodulated data signals 48-2, 48-3, 48-4 are combined in a combiner 50 to produce a combined output signal 52 which is provided to the CPU 40. The independently demodulated data signal 48-1 is not combined with the other signals and is provided directly to the CPU 40, which analyzes the demodulated information provided in the sync channel and determines whether or not the second base station 16 is suitable for use with the mobile station 10. The CPU 40 stores its result in the memory 42, and the process is repeated for the other base stations in the general vicinity whose pilot signal strength, as measured by the searcher 30, exceeds a threshold value. Accordingly, should the pilot signal transmitted by the first base station 14 fall below a given value indicating that it is no longer available for use, the mobile station 10 has available in its memory 42 a list of base stations that are both available and compatible with the mobile station 10 for use.

Figure 2:
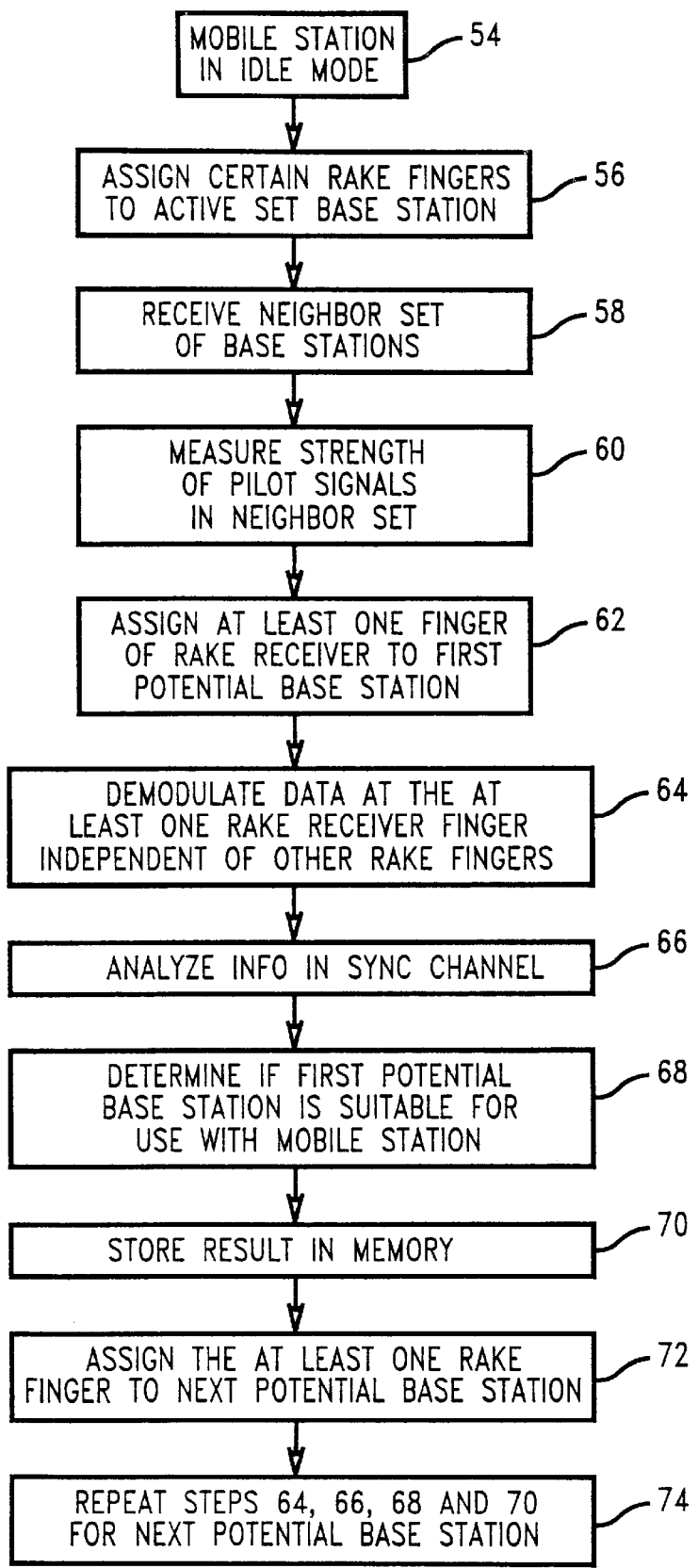
FIG. 2 is a flow diagram illustrating operation of the mobile station in idle mode.

Referring to FIG. 2, a flow diagram illustrating a method of operation of the mobile station 10 shown in FIG. 1 in determining base station suitability is provided. The method begins at step 54, with the mobile station 10 being placed in an idle mode by a user via the keypad 34 or other means.

It is assumed that prior to being placed in the idle mode, the mobile station 10 has established a communications channel with the first base station 14. Accordingly, once being placed in the idle mode, the mobile station 10 will begin monitoring the pilot signal transmitted by its Active Set base station 14 and measuring its strength via the searcher 30. Using the searcher 30 results, fingers 44-2, 44-3, 44-4 of the RAKE receiver 28 are assigned by the CPU 40 to various rays of the Active Set base station 14, at block 56. The rays received at RAKE fingers 44-2, 44-3, 44-4 are conventionally demodulated by the demodulator 46 and combined in the combiner 50 to produce the combined resultant signal 52 provided to the CPU 40.

While monitoring the Active Set base station 14, the mobile station 10 receives, from its Active Set base station 14, a Neighbor Set of base stations, at block 58. The Neighbor Set of base stations is a list of base stations within the general area of the Active Set base station 14, and for the purposes herein will be assumed to include base stations 16, 18, 20, 22. The Neighbor Set of base stations are to be considered for use if the Active Set base station's signal becomes too weak.

Upon receiving the Neighbor Set of base stations, the CPU 40 controls the searcher 30 to measure the strength of the various pilot signals transmitted by the base stations 16, 18, 20, 22 in the Neighbor Set, at block 60. For those base stations whose pilot signal strengths are above a given threshold value, the CPU 40 controls the RAKE receiver 28 by assigning certain of its fingers to receive signals from those base stations. For purposes herein, it will be assumed that the pilot signals transmitted by base stations 16, 18, 20, 22 are all above the given threshold value ("potential base stations").

The CPU 40 assigns at least one finger of the RAKE receiver 28 to the second base station 16, defining a first potential base station, at block 62. For exemplary purposes only, it is assumed that the CPU 40 assigns finger 44-1 of the RAKE receiver 28 to the second base station 16. This is accomplished by tuning finger 44-1 to the PN offset of the second base station 16. Fingers 44-2, 44-3, 44-4 have been previously assigned to the PN offset associated with the first base station 14, which is the currently monitored base station in the Active Set.

The data received at finger 44-1 from the second base station 16, which includes a pilot signal, sync signal, etc., are demodulated in the demodulator 46 independently of the data received at fingers 44-2, 44-3, 44-4, at block 64. The independently demodulated data signal 48-1 is provided to the CPU 40 which analyzes the information provided in the sync channel, at block 66, and determines whether or not the second base station 16 is suitable for use with the mobile station 10, at block 68. There may be many reasons why a prospective base station, offered as a recommendation by the currently monitored base station, is not suitable from the mobile station's perspective. For example, the mobile station may include a list of SIDs (system IDs) or NIDs (network IDs) that are unworkable. There may be other various technology or standard reasons why a base station is not suitable. For example, a mobile station may only be configured to operate on an IS-95B standard system and not an IS-95A standard system, the entity providing the mobile station may not want it to operate in rival systems or networks, etc. This information can be gained by demodulating and analyzing the sync signal transmitted by the base station.

The CPU's 40 determination of whether the second base station 16 is suitable is stored in the memory 42, at block 70. The CPU 40 then assigns finger 44-1 of the RAKE receiver 28 to the third base station 18, which is the next potential base station, by tuning finger 44-1 to the PN offset associated with the third base station 18, at block 72, and steps 64, 66, 68 and 70 are repeated for the next potential base station, at block 74. This process is continued until a suitability determination has been made for all potential base stations.

Since the searcher 30 operates independent of the RAKE receiver 28, the CPU 40 controls the searcher 30 to continuously measure pilot signals of those potential base stations determined to be compatible with the mobile station 10. The pilot signal strength for each compatible potential base station is stored in the memory 42 and continually updated by the searcher 30.

Accordingly, when the signal transmitted by the currently monitored Active Set base station 14 becomes too weak, the mobile station 10 can switch to one of the potential base stations stored in the memory 42 determined to be compatible with the mobile station 10. The mobile station 10 may simply choose the suitable base station with the strongest pilot signal as monitored by the searcher 30, or the new base station may be chosen by other means.

While the invention has been described with particular reference to the drawings, it should be understood that various modifications could be made without departing from the spirt and scope of the present invention.

What is claimed is:

1. A method of determining suitability of a base station for use with a mobile station in a wireless communications system having a plurality of base stations, with the mobile station in an idle mode, said method comprising the steps of:
   (a) assigning a plurality of RAKE receiver fingers to a base station currently monitored by the mobile station for communication purposes;
   (b) selectively assigning at least one of the RAKE receiver fingers to a first potential base station in the plurality of base stations, the first potential base station different from the currently monitored base station;
   (c) demodulating data received at the at least one RAKE receiver finger from the first potential base station independent of data received at the other RAKE receiver fingers from the currently monitored base station; and
   (d) determining, from the independently demodulated data, whether the first potential base station is suitable for use with the mobile station.

2. The method of claim 1, further comprising the steps of:
   (e) storing the determined result associated with the first potential base station in a memory; and
   (f) repeating steps (b)–(e) for all potential base stations in the plurality of base stations.

3. The method of claim 2, wherein the potential base stations include those base stations in the plurality of base stations whose pilot signal strengths exceed a threshold value.

4. The method of claim 2, further comprising the step of:
   (g) if a pilot signal strength of the currently monitored base station falls below a threshold value, replacing the currently monitored base station with one of the potential base stations determined to be suitable for use with the mobile station at step (d).

5. The method of claim 4, further comprising the step of (h) monitoring pilot signal strengths of only those potential base stations determined to be suitable for use with the mobile station at step (d), wherein the replacing potential base station includes the potential base station with the strongest pilot signal strength as monitored at step (h).

6. The method of claim 1, wherein the plurality of base stations comprises a Neighbor Set of base stations transmitted by the currently monitored base station to the mobile station, the Neighbor Set of base stations including base stations potentially useable by the mobile station should the currently monitored base station become unavailable for use.

7. The method of claim 1, wherein the wireless communications system comprises a Code Division Multiple Access wireless communications system.

8. The method of claim 1, wherein step (d) comprises the steps of:
   (i) analyzing a sync signal transmitted by the first potential base station; and
   determining whether the first potential base station is suitable for use with the mobile station based on said analyzation.

9. A method according to claim 1 further comprising:
   measuring signal strengths of a plurality of pilot signals transmitted by a respective plurality of potential base stations different than the currently monitored base station;
   selecting at least one of the potential base stations having a measured signal strength of its respective pilot signal greater than a predetermined threshold; and
   wherein selectively assigning at least one of the RAKE receiver fingers to a first potential base station comprises selectively assigning at least one of the RAKE receiver fingers to one of the potential base stations having a measured signal strength of its respective pilot signal greater than the predetermined threshold.

10. A method according to claim 1 wherein selectively assigning at least one of the RAKE receiver fingers comprises selectively assigning the at least one RAKE receiver finger to receive a sync channel transmitted by the first potential base station, and wherein demodulating data received at the at least one RAKE receiver finger comprises demodulating data of the sync channel.

11. A method according to claim 10 further comprising:
   before selectively assigning at least one of the RAKE receiver fingers, measuring a signal strength of a pilot signal transmitted by the first potential base station different than the currently monitored base station.

12. A method of determining suitability of a base station for use with a mobile station in a wireless communications system with the mobile station in an idle mode, said method comprising the steps of:
   (a) assigning a plurality of RAKE receiver fingers to a base station currently monitored by the mobile station for communication purposes;
   (b) receiving a Neighbor Set of base stations from the currently monitored base station;
   (c) selectively assigning at least one RAKE receiver finger to a first potential base station in the Neighbor Set of base stations, the first potential base station different from the currently monitored base station;
   (d) demodulating data received at the at least one RAKE receiver finger from the first potential base station independent of data received at the other RAKE receiver fingers from the currently monitored base station; and
   (e) determining, from the independently demodulated data, whether the first potential base station is suitable for use with the mobile station.

13. The method of claim 12 further comprising the steps of:
   (f) storing the determined result associated with the first potential base station in a memory; and
   (g) repeating steps (c)–(f) for a second potential base station in the Neighbor Set of base stations.

14. The method of claim 13, further comprising the steps of:
   (h) repeating steps (c)–(f) for all potential base stations in the neighbor set of base stations;
   (i) monitoring pilot signal strengths of only those potential base stations determined to be suitable for use with the mobile station at step (e); and
   (j) if the pilot signal strength of the currently monitored base station falls below a threshold value, replacing the currently monitored base station with one of the potential base stations determined to be suitable for use with the mobile station at step (e).

15. The method of claim 14, wherein the replaced potential base station includes the potential base station with the strongest pilot signal strength as monitored at step (i).

16. The method of claim 12 wherein step (e) comprises the steps of:
   (k) analyzing a sync signal transmitted by the first potential base station; and
   (l) determining whether the first potential base station is suitable for use with the mobile station based on said analyzation.

17. The method of claim 12 wherein the wireless communications system comprises a Code Division Multiple Access wireless communications system.

18. A method according to claim 12 further comprising:
   measuring signal strengths of pilot signals transmitted by respective ones of the Neighbor Set of base stations different than the currently monitored base station;
   selecting at least one of the base stations of the Neighbor Set having a measured signal strength of its respective pilot signal greater than a predetermined threshold; and
   wherein selectively assigning at least one of the RAKE receiver fingers to a first potential base station comprises selectively assigning at least one of the RAKE receiver fingers to one of the base stations of the Neighbor Set having a measured signal strength of its respective pilot signal greater than the predetermined threshold.

19. A method according to claim 12 wherein selectively assigning at least one of the RAKE receiver fingers comprises selectively assigning the at least one RAKE receiver finger to receive a sync channel transmitted by the first potential base station, and wherein demodulating data received at the at least one RAKE receiver finger comprises demodulating data of the sync channel.

20. A method according to claim 19 further comprising:
   before selectively assigning at least one RAKE receiver finger, measuring a signal strength of a pilot signal transmitted by the first potential base station different than the currently monitored base station.

21. A mobile station for use in a wireless communications system including a plurality of base stations, said mobile station comprising:

a searcher for measuring strength of pilot signals transmitted by the plurality of base stations;

a RAKE receiver having a plurality of receiver fingers; and a controller coupled to the searcher and the RAKE receiver, the controller assigning a plurality of RAKE receiver fingers to one of the base stations currently monitored by the mobile station for communication purposes, and selectively assigning at least one RAKE receiver finger to a first potential base station in the plurality of base stations, the first potential base station different from the currently monitored base station, the controller demodulating data received at the at least one RAKE receiver finger from the first potential base independent of data received at the other RAKE receiver fingers from the currently monitored base station, and determining, from the independently demodulated data, whether the first potential base station is suitable for use with a mobile station.

22. The mobile station of claim 21 wherein the controller includes a memory for storing the determined result associated with the first potential base station.

23. The mobile station of claim 21, wherein the wireless communications system comprises a Code Division Multiple Access wireless communications system.

24. A method according to claim 21 wherein the controller selects at least one of the potential base stations from the plurality of base stations having a measured signal strength of its respective pilot signal greater than a predetermined threshold, and wherein the controller selectively assigns the at least one RAKE receiver finger to a first potential base station selected from the at least one of the potential base stations having a measured signal strength of its respective pilot signal greater than the predetermined threshold.

25. A method according to claim 21 wherein the controller selectively assigns the at least one RAKE receiver finger to receive a sync channel transmitted by the first potential base station, and wherein the controller demodulates data of the sync channel.

26. A method according to claim 25 wherein the searcher measures a signal strength of a pilot symbol transmitted by the first potential base station before the controller selectively assigns the at least one RAKE receiver finger.

* * * * *